United States Patent
Ting

(10) Patent No.: US 7,568,926 B2
(45) Date of Patent: Aug. 4, 2009

(54) CARD CONNECTOR HAVING EJECTING MECHANISM

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/150,712

(22) Filed: Apr. 30, 2008

(65) Prior Publication Data

US 2008/0268684 A1 Oct. 30, 2008

(30) Foreign Application Priority Data

Apr. 30, 2007 (TW) .................................. 96115262

(51) Int. Cl.
*H01R 13/62* (2006.01)
(52) U.S. Cl. ..................................................... 439/159
(58) Field of Classification Search ................. 439/159, 439/541.5, 152
See application file for complete search history.

(56) References Cited

U.S. PATENT DOCUMENTS

| | | | |
|---|---|---|---|
| 6,991,480 B2 | 1/2006 | Kamata | |
| 7,003,190 B2 * | 2/2006 | Zhang et al. | 385/17 |
| 7,018,222 B2 * | 3/2006 | Chang | 439/159 |
| 7,033,190 B1 * | 4/2006 | Chen | 439/159 |
| 7,052,316 B2 | 5/2006 | Tanigawa | |
| 7,090,537 B1 | 8/2006 | Nakamura | |
| 2006/0046567 A1 * | 3/2006 | Ho et al. | 439/607 |
| 2006/0128189 A1 | 6/2006 | Kuo | |
| 2006/0196781 A1 | 9/2006 | Kimura | |

* cited by examiner

*Primary Examiner*—Phuong K Dinh
(74) *Attorney, Agent, or Firm*—Wei Te Chung

(57) ABSTRACT

A card connector (1) for receiving a card, includes an insulating housing (30), a rectangular shell (11), and an ejecting mechanism (5, 6). The insulating housing comprises a base section (31) and a base seat (33) at a lateral side of the base section. The shell defines a receiving space (220) having an L-shape card slot (140) and a rectangular space (141) at a back corner of the receiving space along an inserting direction of a card. The ejecting mechanism is mounted on the base seat. The shell covers on the insulating housing with the base section located in the card slot, and the base seat is situated in the rectangular space. A width of the base section and the base seat is approximately equal to that of the shell along a transverse direction perpendicular to an insertion direction of a card.

9 Claims, 7 Drawing Sheets

CARD CONNECTOR HAVING EJECTING MECHANISM

BACKGROUND OF THE INVENTION

1. Field of the Invention

The present invention relates to a card connector, and particularly to a card connector comprising an ejecting mechanism.

2. Description of Prior Arts

Memory cards are known in the art and contain intelligence in the form of a memory circuit or other electronic program. Some form of card reader reads the information or memory stored on the card. Memory cards are used in many applications in today's electronic society, including video cameras, smartphones, music players, ATMs, cable television decoders, toys, games, PC adapters and other electronic applications. A typical memory card includes a contact or terminal array for connection through an electrical connector to a card reader system and then to external equipment. The connector readily accommodates insertion and removal of the card to provide quick access to the information and program on the card. The card connector includes terminals for yieldably engaging the contact or terminal array of the card. Additionally, the connector always has an ejecting mechanism for ejecting the insertion card out.

In one prior art, a card connector has a first connector and a second connector stacked with the first connector. Each connector has an ejecting member mounted on a lateral side thereof, and each ejecting mechanism comprises a pushing bar operated by a user, and an ejecting bar engaging with a card directly for pushing the card out.

However, such card connector is mounted in an electronic equipment, the long pushing bar of the ejecting mechanisms occupy a big space of the internal space of the electronic equipment. Moreover, the mechanism is disposed on the lateral side of the card connector, and there is no additional member to cover thereon completely. Therefore, an interference will be encountered to the ejecting mechanism by other external equipments.

In another prior art, a card connector has an L-shape receiving space. In the receiving space, an ejecting mechanism is fitted and covered partially therein. However, a part of the ejecting mechanism is operated in the receiving space, and make the overall height of the card connector increased.

Therefore, the present invention is directed to solving these various problems by providing a card connector which reduces the overall size of the connector and achieves a stable electrical mechanism.

SUMMARY OF THE INVENTION

An object, therefore, of the invention is to provide a card connector capable of reducing overall size of the connector, saving cost and having a convenient assembly process.

In the exemplary embodiment of the invention, a card connector for receiving a card, includes an insulating housing, a rectangular shell, and an ejecting mechanism. The insulating housing comprises a base section and a base seat at a lateral side of the base section. The shell defines a receiving space having an L-shape card slot and a rectangular space at a back corner of the receiving space along an inserting direction of a card. The ejecting mechanism is mounted on the base seat. The shell covers on the insulating housing with the base section located in the card slot, and the base seat is situated in the rectangular space. A width of the base section and the base seat is approximately equal to that of the shell along a transverse direction perpendicular to an insertion direction of a card.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
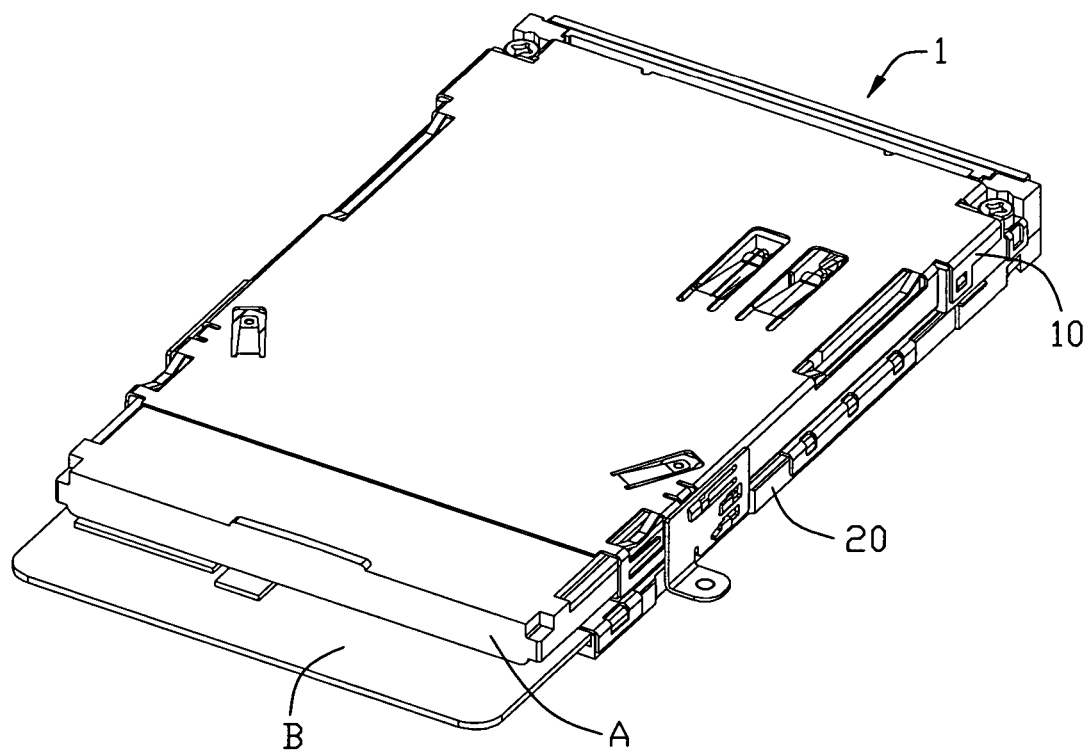
FIG. 1 is a perspective view of a card connector of present invention.

Referring to FIG. 1 to FIG. 7, the present invention provides a card connector 1 which is used for a connection with two cards having mutually different transmission speeds, such as an Express card, and a Smart card. The card connector 1 comprises a first connector 10 defining a first receiving space 14 for receiving a first card A, a second connector 20 stacked with the first connector 10 and defining a second receiving space 220 for receiving a second card B, and an opening (not labeled) for a card inserting/ejecting.

Figure 2:
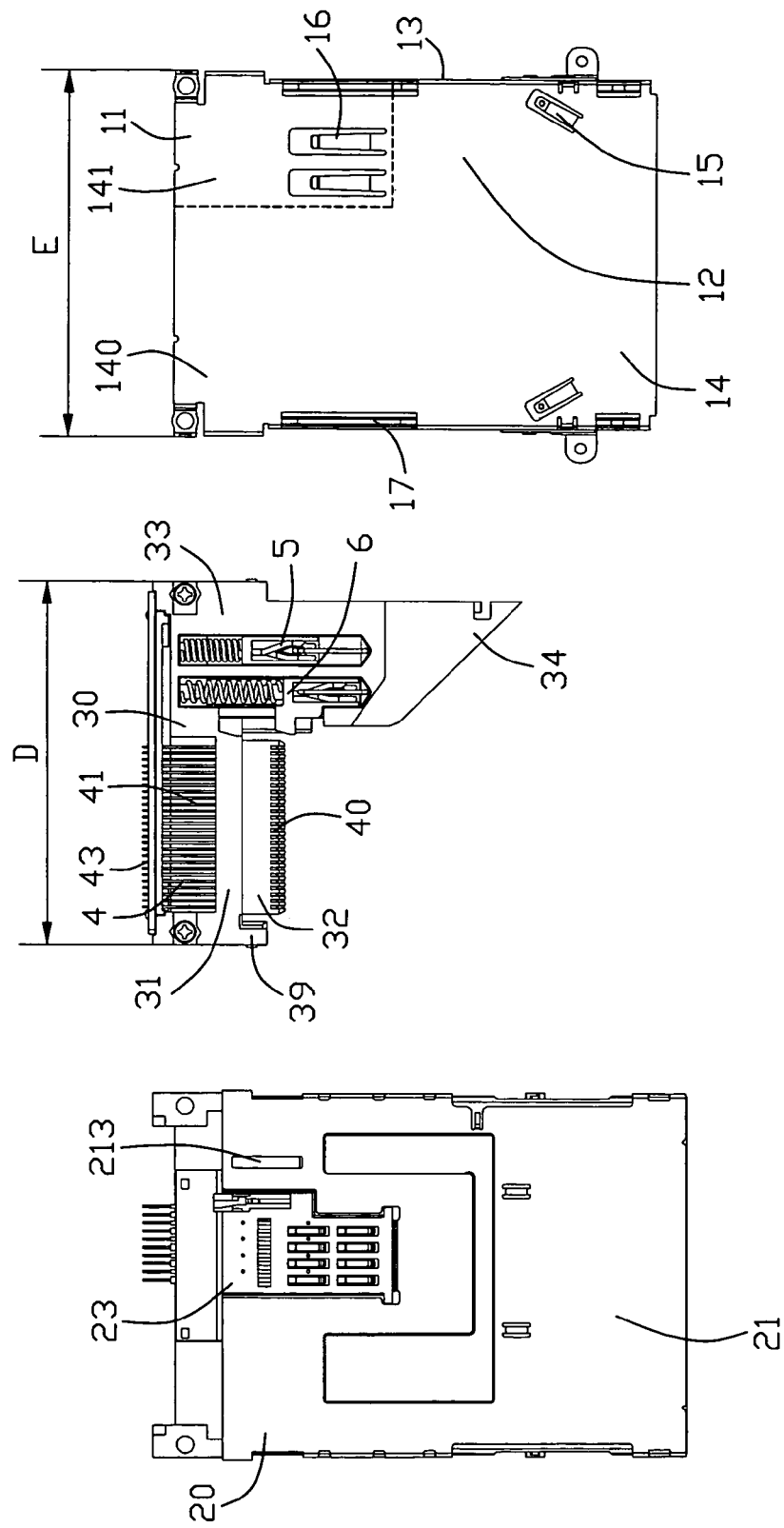
FIG. 2 is an exploded and top plan view of the card connector of present invention as shown in FIG. 1.

As shown in FIG. 1 and FIG. 2, the first connector 10 comprises a first metal shell 11, an insulating housing 30 covered by the first shell 11, a plurality of first contacts 4 protruding into the first receiving space 14 to engage with the first card A, a first ejecting mechanism 6 and a second ejecting mechanism 5 for ejecting the first card A and the second card B, respectively.

The first shell 11, approximate a rectangular shape in a top plan view, and an U shape in a front view, comprises a first top wall 12, and a pair of first lateral walls 13 extending downwardly from the opposite sides of the first top wall 12. The first receiving space 14 is defined by the first top wall 12 associating with the first lateral walls 13 and is divided into an L-shape card slot 140 to receive the first card A and a rectangular space 141, as a broken line shown in FIG. 2. When the first card A is received in the card slot 140, the rectangular space 141 is rightly at a cut portion F (shown in FIG. 7) of the first card A. The first top wall 12 has a pair of first elastic pieces 15, a pair of second elastic pieces 16, and a pair of first projecting portions 17. A sharp angle is defined between each elastic pieces 15 and an insertion direction of the card. The elastic pieces 15 are used for pressing on a metal part C (shown in FIG. 7) of the first card A, serving as a grounding portion or fastening portion. The first projecting portions 17 are provided to guide the first card inserted stably. The second elastic pieces 16 extend along the insertion direction of the card.

Figure 3:
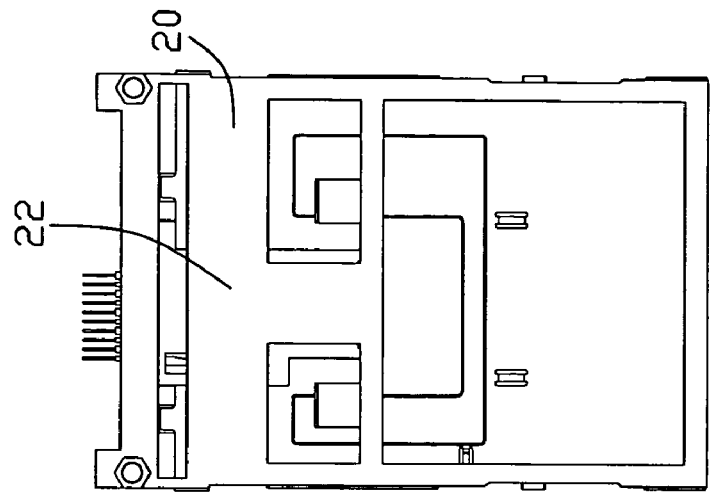
FIG. 3 is a bottom view of the card connector as shown in FIG. 2.
Figure 3:
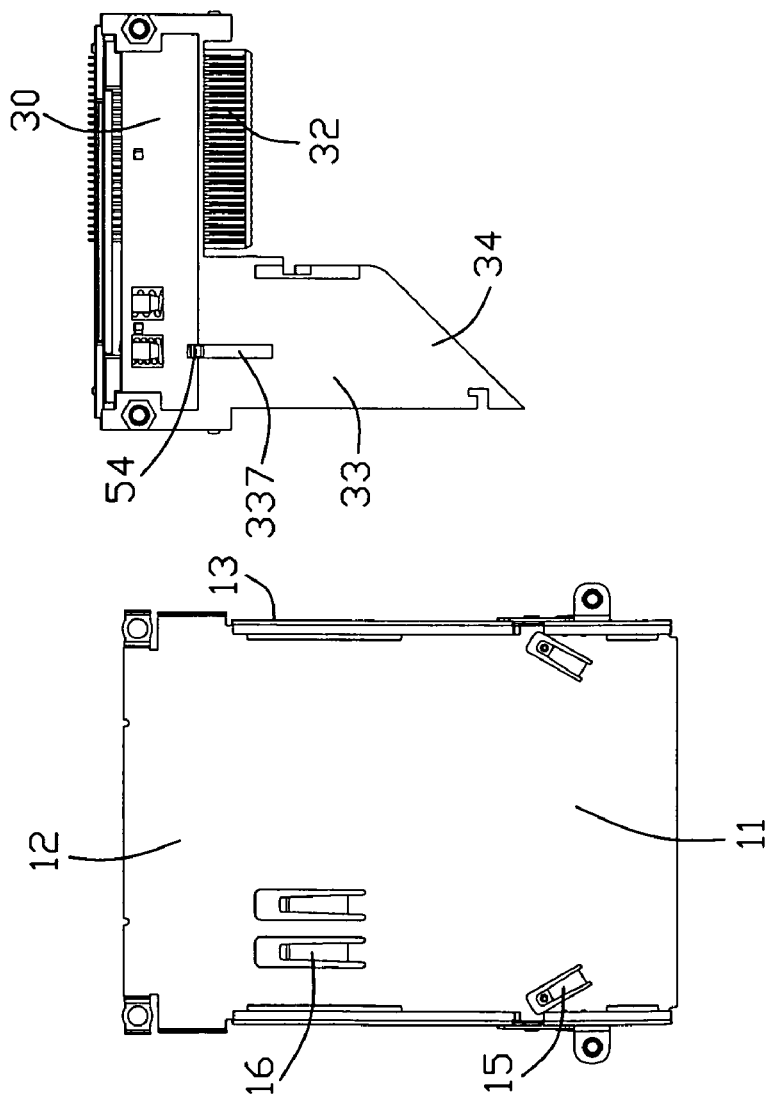
Figure 4:
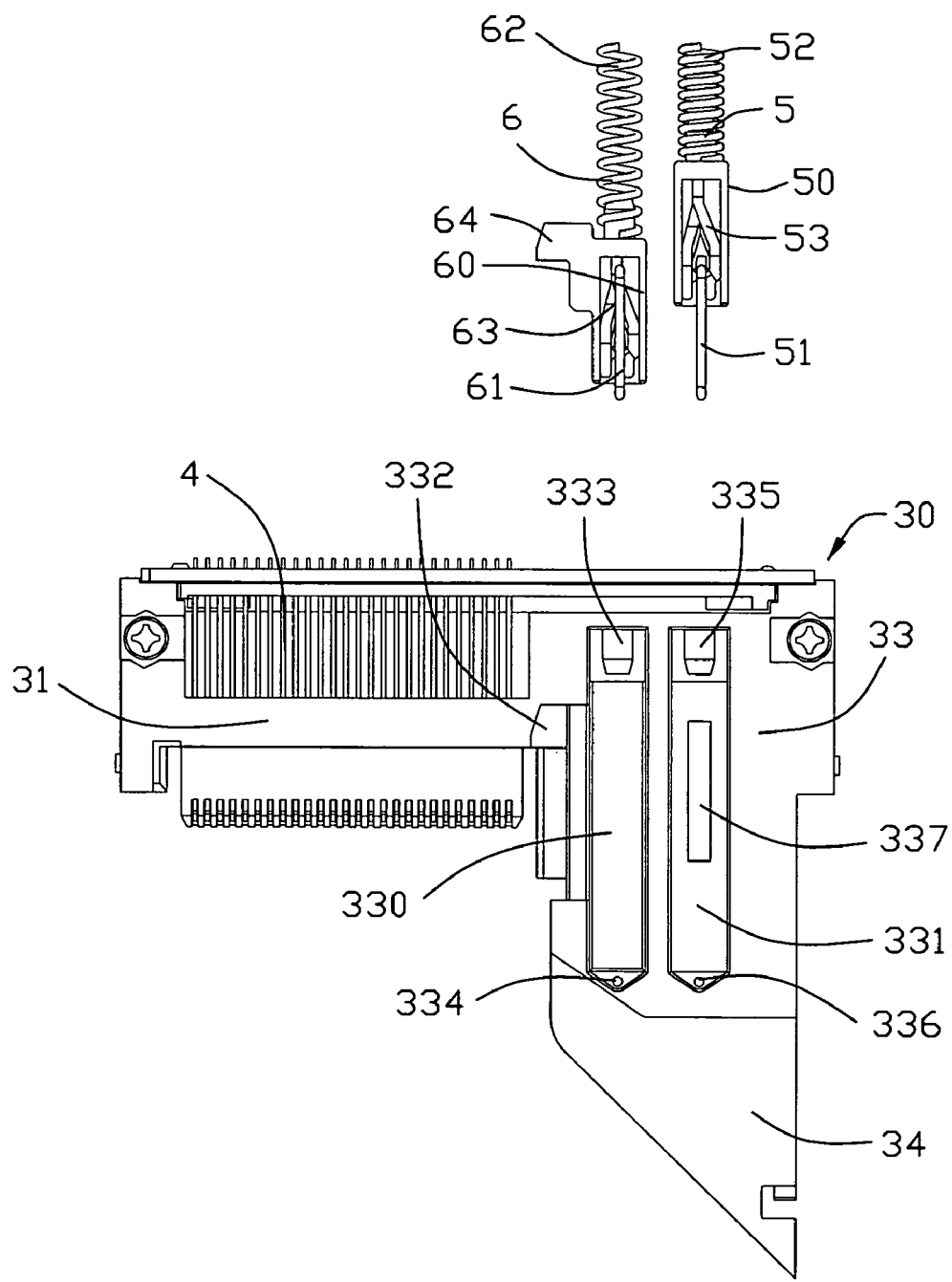
FIG. 4 is a top plan view of a first ejecting mechanism, a second ejecting mechanism and an insulating housing of the card connector according with present invention.

Referring to FIG. 2 to FIG. 4, the first insulating housing 30, structured as an L shape in a top plane view, comprises a base section 31 and a base seat 33 extending laterally from the base section 31. Getting along a transverse direction perpendicular to the insertion direction of the card, a width D defined by the base section 31 associating with the base seat 33 is approximately equivalent to the width E of the metal shell 11. The base section 31 has a main portion (not labeled), an arm portion 39 at one end of the main portion, an engaging plate 32 extending from the main portion and perpendicular to the arm portion 39. The first contact 4 is received in the engaging plate, and each contact 4 comprises an engaging portion 40, a soldering portion 43 and a connecting portion 41 joining the engaging portion 40 with the soldering portion 43.

The base seat 33, designed approximately in a rectangular shape and longer than the base section 31 along the insertion direction of the card, has a first sliding groove 330 and a second sliding groove 331 perpendicular to the first sliding groove 330. The first sliding groove 330 and the second sliding groove 331, respectively, have a post 333, 335 at one end thereof, and a position hole 334, 336 opposite to corresponding post 333, 335. Particularly, the first sliding groove 330 and the second sliding groove 331 have a first sliding channel 332 and a second sliding channel 337, respectively. The first sliding channel 332 is formed at one edge of the first sliding groove 330, and the second sliding groove 337 is formed at the bottom of the second sliding groove 331 to communicating with the second card slot 220. Moreover, in this embodiment of the present invention, the base seat 33 has a triangle plate 33 extending therefrom forwardly and integrally to guide different card inserting.

As shown in FIG. 4, the first mechanism 6 and the second mechanism 5 are structured almost simple to each other and operated by an inserting card, and comprise, respectively, a first ejecting member 60, a second ejecting member 50 protruding into corresponding receiving space, a first spring member 62, a second spring member 52 for moving the ejecting member 60, 50 towards the card ejecting direction, a first heart groove 63, a second heart groove 53 and a first latch member 61, a second latch member 51 sliding in the heart groove 63, 53 to overcome the spring member 62, 52 and place the ejecting member 60, 50 in a desirable position. The first ejecting member 60 and the second ejecting member 50, respectively, have a first pushing portion 64 extending laterally from one side of the first ejecting member 60, a second pushing portion 54 (shown in FIG. 6) extending downwardly from a bottom of the second ejecting member 50.

Figure 5:
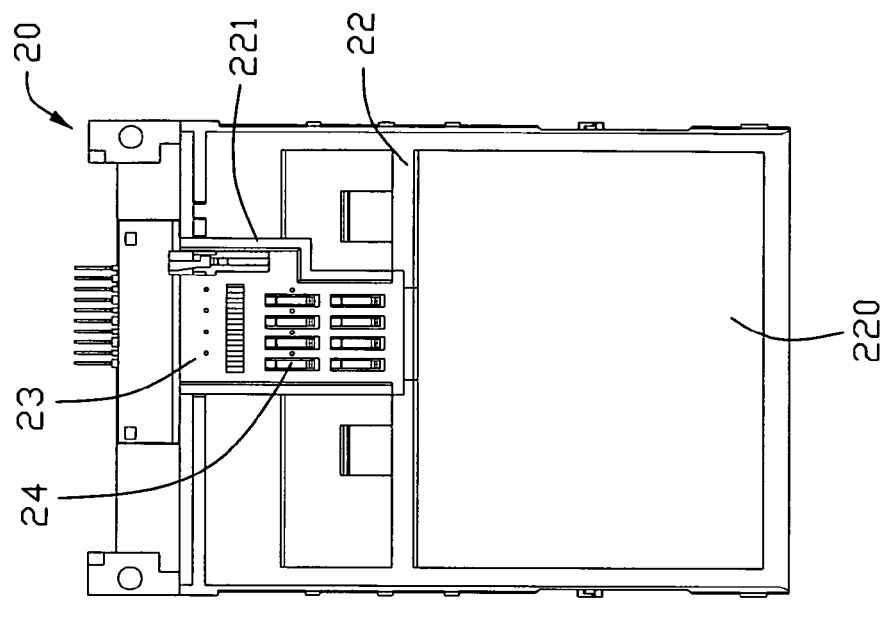
FIG. 5 is an exploded and top plan view of a second connector of the card connector according with present invention.
Figure 5:
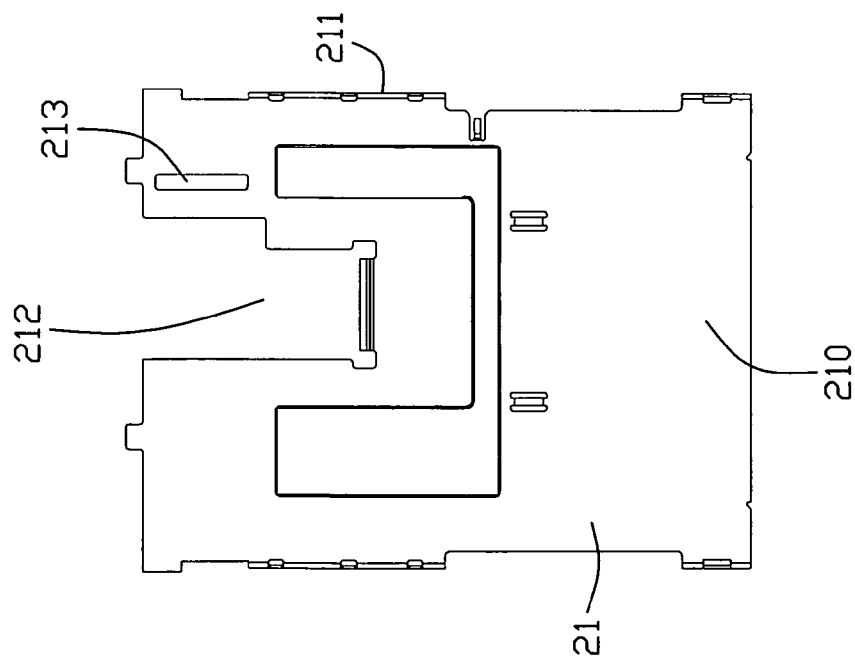

Together with FIG. 2, FIG. 3 and FIG. 5, the second connector 20 is placed under the first connector 10 respect to a printed circuit board (not shown) and comprises a second metal shell 21, a terminal module 23 aligned with the second shell 21, and a bottom plate 22 associating with the second shell 21 to define the second receiving space 220.

The second shell 21 is approximately a rectangular shape, and comprises a second top wall 210, a pair of second side walls 211 extending downwardly from opposite sides of the top wall 210. The second top wall 210 has a fixing hole 212 in alignment with the terminal module 23, and a longitudinal groove 213 in accordance with the second slipping groove 337 of the second guiding groove 331.

The bottom plate 22 is constructed according with the second shell 21, and comprises a recess 221 to receiving the terminal module 23. In the terminal module 23, a plurality of second terminals 24 is retained and protrudes upwardly in the second card slot 220 to engaging with the second card B electrically.

Figure 6:
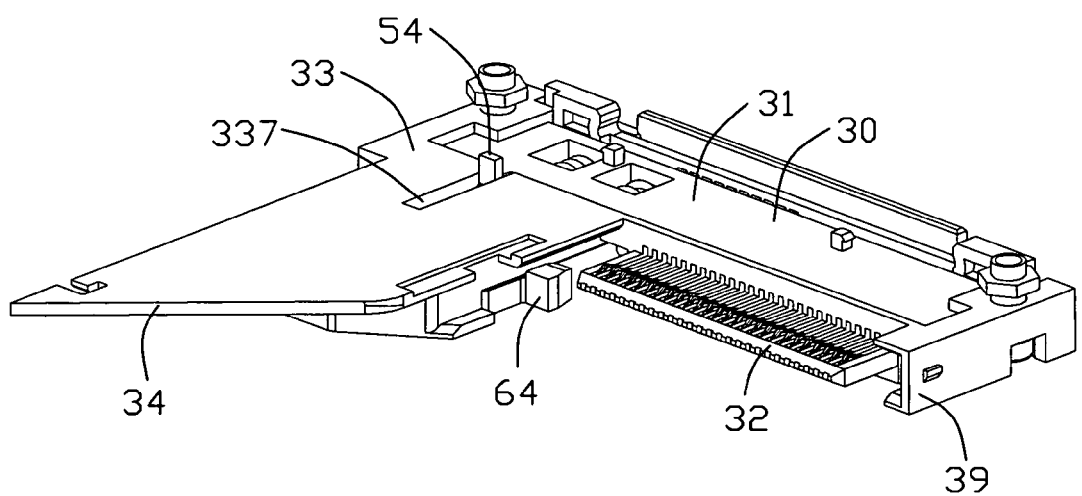
FIG. 6 is a perspective view of the insulating housing of the card connector.
Figure 7:
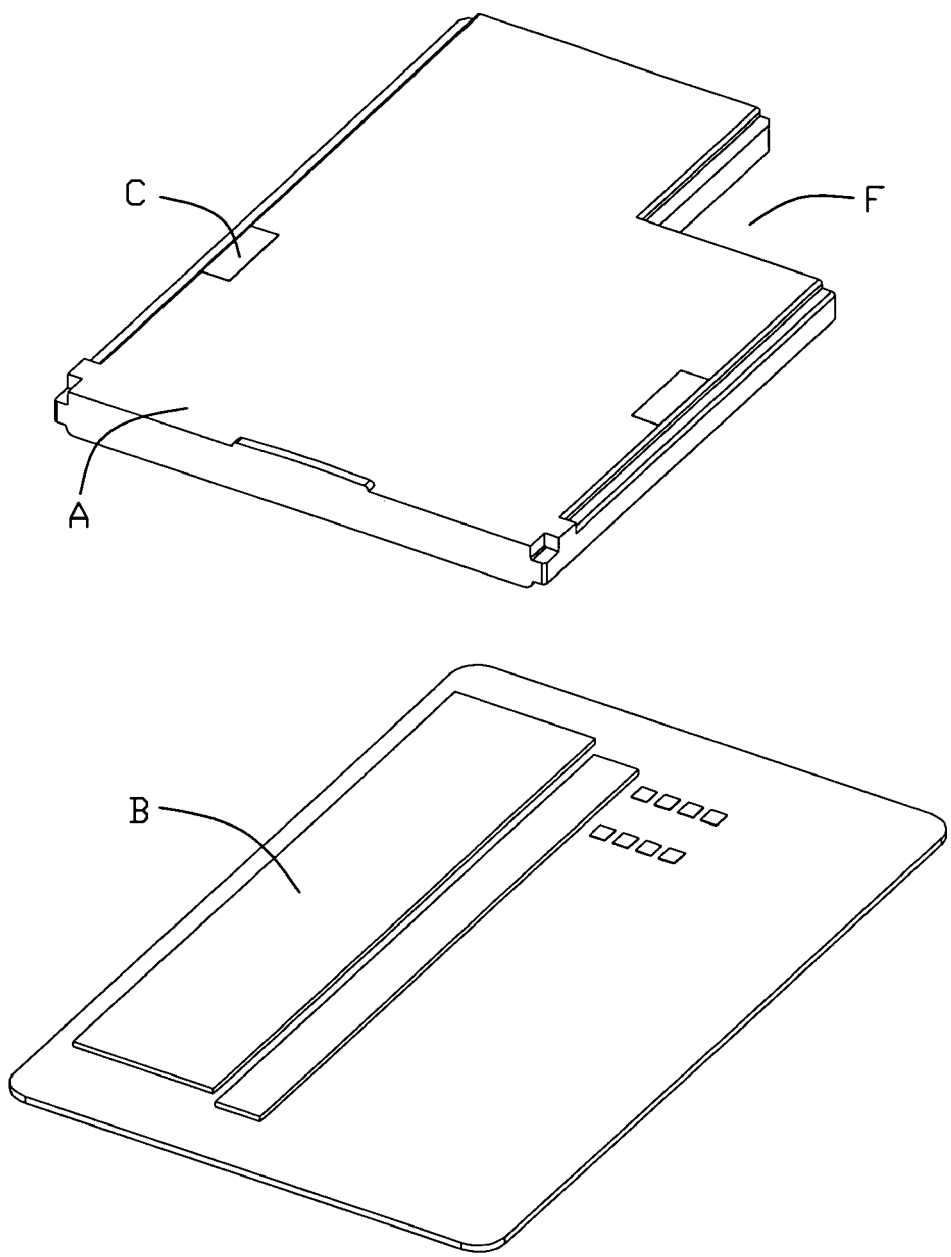
FIG. 7 is a perspective view of a first card and a second card allowed to be received in the card connector of present invention.

Referring to FIG. 4, the relationship between the first ejecting mechanism 6, the second ejecting mechanism 5 and the first groove 330, the second groove 331 will be described in detail. The first ejecting mechanism 6 is mounted in the first groove 330 with the first pushing portion 64 protruding into the first card slot 140, one end of the spring member 62 connecting the ejecting member 60 and the other aligned with the post 333, one end of the latch member 61 slipping in the heart groove 63 and the other placed in the position hole 334. The second ejecting mechanism 5 is mounted in the second groove 331 in the same way as described of the first ejecting mechanism 6, except that the second pushing portion 54 protrudes downwardly into the second receiving space 220 by going through the second slipping channel 337 and the longitudinal groove 213 of the second metal shell 21 orderly, as shown in FIG. 2 and FIG. 6.

According with present invention, the first ejecting mechanism 6 and the second mechanism 5 is mounted in the first sliding groove 330 and the second sliding groove 331, more particularly, both the first sliding groove 330 and the second sliding groove 331 are formed on the base seat 33 side by side, and the base seat 33 is rightly fitted in the rectangular space 141. On one hand, it is needless to design another module to couple with the ejecting mechanisms. So a simple, convenient assembly process is achieved, accordingly, to save cost. On the other hand, the base seat 33 allows more ejecting mechanisms to be designed thereon, but do not take additional room as before to save more space. Besides, the first mechanism 6 and the second mechanism 5 are covered by the first shell 14 completely avoiding to being disposed out thereof and interfered by other device.

In this embodiment of present invention, the card connector 1 is structured by vertically stacking two connectors that receive different cards. In another embodiment, a card connector is constructed by three connectors for receiving three cards, and one connector is designed as the first card connector 10 described above with three two ejecting mechanisms mounted on a base seat 33 thereof, and the other two connectors are stacked vertically on opposite sides of said connector. The ejecting mechanisms protrude into corresponding card slot upwardly or downwardly to engaging with cards. Such structure also reduces overall size of the card connector, and save more space. In a third embodiment, a card connector comprises two card connectors arranged in a transverse direction or in a level, and two ejecting mechanisms are placed on a base seat formed between the two connectors, particularly, one of the connector should be designed as the first connector 1, and a base seat is rightly received in a rectangular space to couple with ejecting mechanisms.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector for receiving a card, comprising:
    an insulating housing comprising a base section and a base seat at a lateral side of the base section;
    a rectangular shell defining a receiving space having an L-shape card slot and a rectangular space at a back corner of the receiving space along an inserting direction of a card; and an ejecting mechanism mounted on the base seat of the insulating housing; wherein the shell covers on the insulating housing with the base section located in the card slot, the base seat is situated in the rectangular space, and a width of the base section and the base seat is approximately equal to that of the shell along a transverse direction perpendicular to the inserting direction of the card, wherein the base seat comprises a second sliding groove beside the sliding groove to receive the second mechanism, wherein the sliding groove and the second sliding groove are arranged side by side with respect to the transverse direction of a card, wherein the second mechanism comprises a second ejecting member moving in the second sliding groove, a second spring member for moving the second ejecting member towards an ejecting direction of the card, and a second latch member for holding the second ejecting member in position, wherein the ejecting member and the second ejecting member extend in different directions into the first receiving space and the second receiving space, respectively, wherein the ejecting member of the ejecting mechanism extends into the receiving space in a first direction and the second ejecting mechanism extends into the second receiving space in a second direction perpendicular to the first direction, wherein the ejecting mechanism protrudes into the card slot by passing through a sliding channel formed on one edge of the sliding groove, and the second ejecting mechanism protrudes into the second receiving space by passing through a second sliding channel formed on a bottom of the second sliding groove.

2. The card connector as claimed in claim 1, wherein the base section and the base seat are formed integrally, and the base seat is dimensioned in conformity with the rectangular space.

3. The card connector as claimed in claim 1, wherein a sliding groove is formed on the base seat, and the ejecting mechanism is received in the sliding groove.

4. The card connector as claimed in claim 3, wherein the ejecting mechanism comprises an ejecting member protruding into the card slot, a spring member for moving the ejecting member towards an ejection direction of the card, a heart groove and a latch member for holding the ejecting member in the heart groove.

5. The card connector as claimed in claim 4, wherein the sliding groove comprises a sliding channel at one side thereof allowing the ejecting member to slide therein.

6. The card connector as claimed in claim 4, wherein the shell comprises a top wall and a pair of lateral walls extending downwardly from opposite sides of the top wall, and an elastic piece is formed on the top wall and presses on the latch member.

7. The card connector as claimed in claim 1, wherein an elastic piece is formed on the metal shell adjacent to an opening of the shell, and an angle is defined between an insertion direction of the card and the elastic piece, for pressing on a metal portion of the card.

8. The card connector as claimed in claim 4, further comprising a second connector with a second receiving space and a second ejecting mechanism mounted on the base seat to remove a card in the second receiving space.

9. The electrical card connector as claimed in claim 8, wherein the card connector is stacked on the second connector.

* * * * *